United States Patent

Devier et al.

[11] Patent Number: 6,037,901
[45] Date of Patent: Mar. 14, 2000

[54] SYSTEM AND METHOD FOR COMMUNICATING INFORMATION FOR FLEETS OF EARTHWORKING MACHINES

[75] Inventors: Lonnie J. Devier, Kobe, Japan; N. Keith Lay, Cranberry; Satish M. Shetty, Murrysville, both of Pa.; Adam J. Gudat, Edelstein, Ill.

[73] Assignee: Caterpillar Inc., Peoria, Ill.

[21] Appl. No.: 09/312,876

[22] Filed: May 17, 1999

[51] Int. Cl.[7] .................................. G01S 5/02; H04B 7/185
[52] U.S. Cl. .................................. 342/357.17; 342/357.06; 701/213
[58] Field of Search .................. 342/357.06, 357.17; 701/2, 50, 213

[56] References Cited

U.S. PATENT DOCUMENTS 5,477,459 12/1995 Clegg et al. .................................. 364/460
5,905,968 5/1999 Staub et al. .................................. 702/150

*Primary Examiner*—Thomas H. Tarcza
*Assistant Examiner*—Dao L. Phan
*Attorney, Agent, or Firm*—Steve D. Lundquist

[57] ABSTRACT

A communications system and method for fleets of earthworking machines. The system and method includes a global communications level for communicating over long range distances, at least one site communications level for communicating over medium range distances, and at least one theater communications level for communicating over short range distances. The system and method also includes at least one local communications level for communicating between earthworking machines, and a fleet manager for coordinating communications of the earthworking machines as a function of at least one of the global communications level, the site communications level, the theater communications level, and the local communications level.

34 Claims, 3 Drawing Sheets

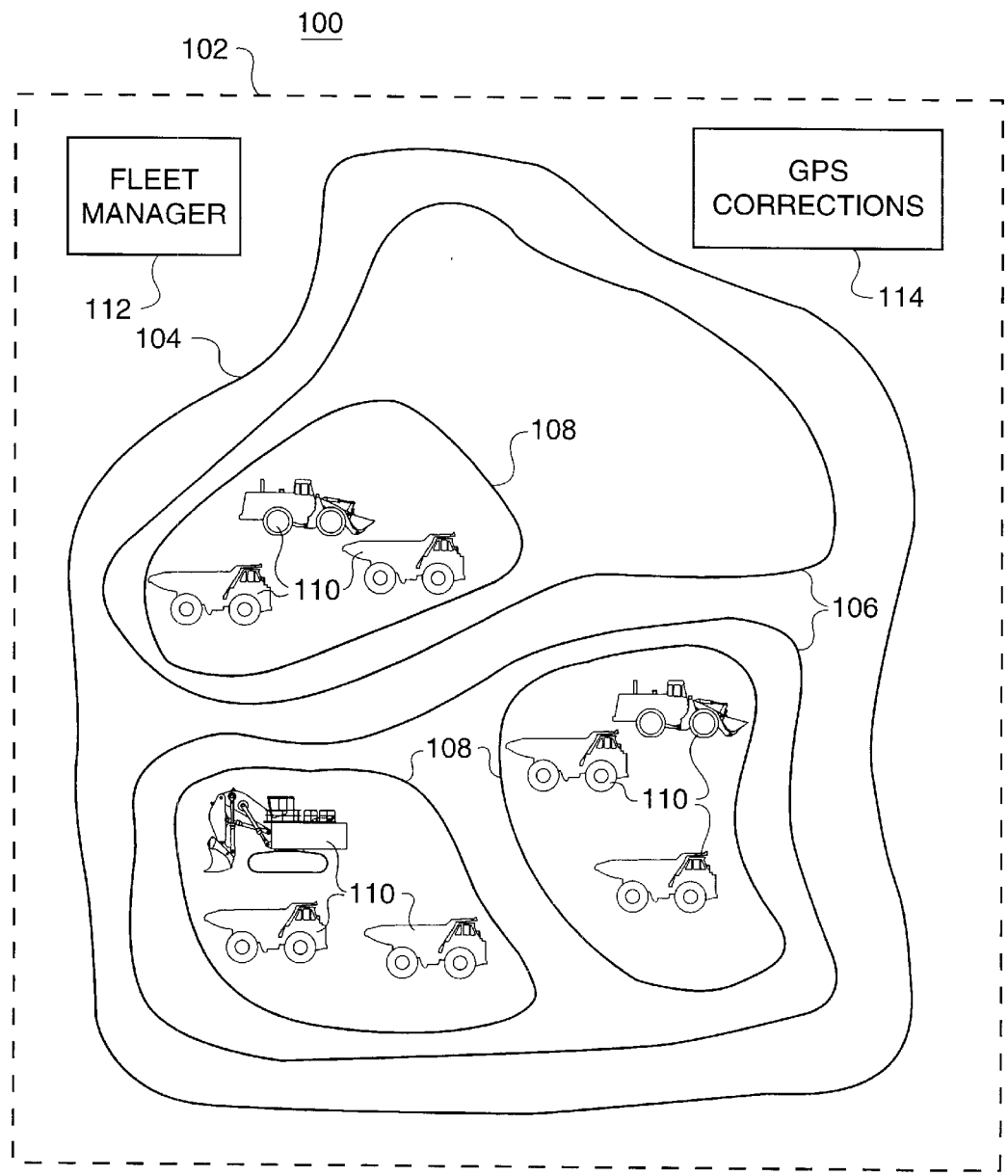

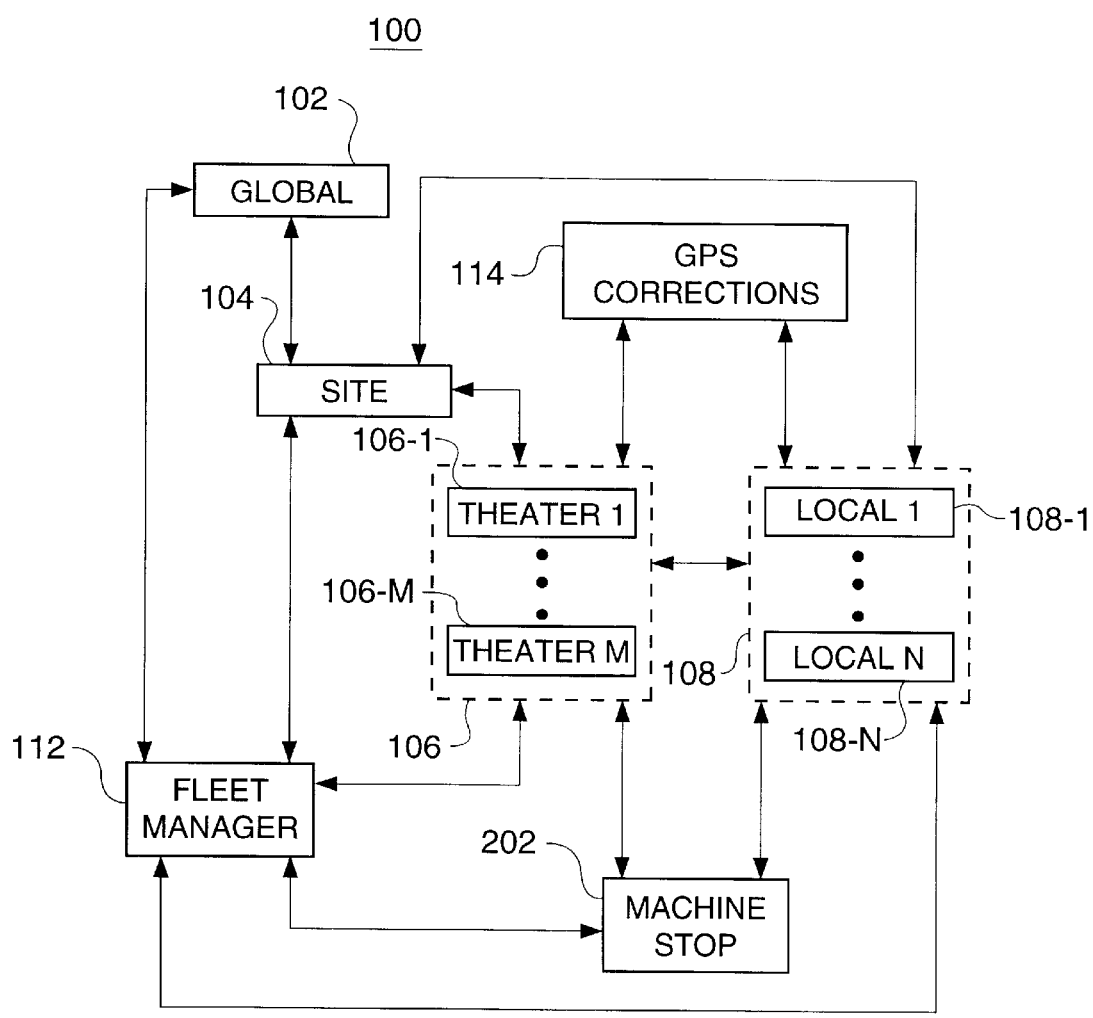

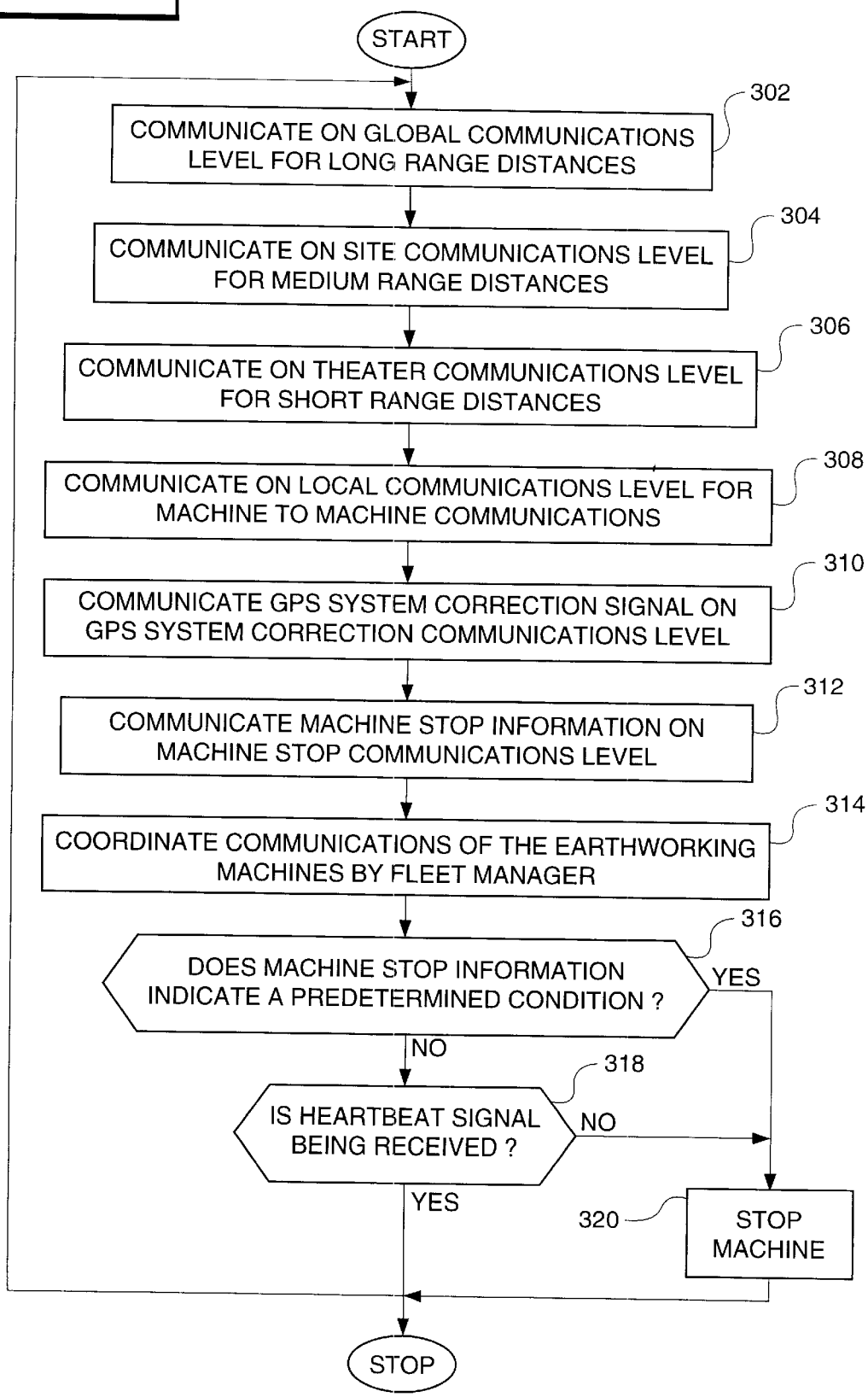

SYSTEM AND METHOD FOR COMMUNICATING INFORMATION FOR FLEETS OF EARTHWORKING MACHINES

TECHNICAL FIELD

This invention relates generally to a system and method for communicating information for fleets of earthworking machines and, more particularly, to a system and method for communicating information for fleets of earthworking machines using coordinated communications levels.

BACKGROUND ART

Earthworking operations are becoming increasingly more complex and sophisticated. Advances in technology have enabled earthworking machines to perform work operations more efficiently, accurately, and reliably. Technologies such as position determination, control systems, autonomous and remote operations, and machine perception have enabled earthworking machines to perform tasks that have previously been possible to perform by only the most experienced human operators. The results of these advances in machine technology have been higher productivity and increased precision in the work performed.

However, the increase in complexity of the technologies employed, and the corresponding increase in work output, have put strains on the communications needed to efficiently coordinate large and complicated earthworking operations. The amount of information required to be communicated has increased dramatically, and the need for reliable and speedy communications is becoming increasingly important.

In addition, as earthworking operations become much larger, becoming even global in scope, the types of communications technologies needed to sustain operations becomes more diverse, thus causing problems with multiple communications systems not being compatible with one another. It is critical, for these large earthworking systems to function smoothly and efficiently, to have the capability to control and coordinate the varied communications systems to deliver information when and where needed.

The present invention is directed to overcoming one or more of the problems as set forth above.

DISCLOSURE OF THE INVENTION

In one aspect of the present invention a communications system for fleets of earthworking machines is disclosed. The system includes a global communications level for communicating over long range distances, at least one site communications level for communicating over medium range distances, and at least one theater communications level for communicating over short range distances. The system also includes at least one local communications level for communicating between earthworking machines, and a fleet manager for coordinating communications of the earthworking machines as a function of at least one of the global communications level, the site communications level, the theater communications level, and the local communications level.

In another aspect of the present invention a method for communicating information for fleets of earthworking machines is disclosed. The method includes the steps of communicating on a global communications level in response to the need to communicate over long range distances, communicating on at least one site communications level in response to the need to communicate over medium range distances, and communicating on at least one theater communications level in response to the need to communicate over short range distances. The method also includes the steps of communicating on at least one local communications level in response to the need for earthworking machines to communicate with each other, and coordinating the communications of the earthworking machines as a function of at least one of the global communications level, the site communications level, the theater communications level, and the local communications level.

BRIEF DESCRIPTION OF THE DRAWINGS

FIG. 1 is a diagrammatic illustration of an aspect of the present invention;

FIG. 2 is a diagrammatic illustration of another aspect of the present invention; and FIG. 3 is a flow diagram illustrating a method of the present invention.

BEST MODE FOR CARRYING OUT THE INVENTION

Referring to the drawings, and with particular reference to FIGS. 1 and 2, a communications system 100 for fleets of earthworking machines 110 engaged in earthworking operations is shown. The earthworking operations may be with reference to mining, construction, agricultural, forestry, or other types of earthworking operations.

FIG. 1 is a diagrammatic illustration of multiple earthworking machines 110 engaged in operations at several locations, such as is commonly found at a large mining site. However, FIG. 1 may be representative of fleets of earthworking machines 110 engaged in any of the types of earthworking operations described above.

The earthworking machines 110 embodied in FIG. 1 are representative of wheel loaders and excavators, i.e., loading machines, and off-road mining trucks, i.e., hauling machines. However, other types of earthworking machines, e.g., front shovels, articulated trucks, dozers, graders, compactors, agricultural machines, scrapers, and the like, may be used in the present invention as well. In addition, other types of machines not normally classified as earthworking machines, e.g., service trucks, supervisor and foreman trucks, water trucks, survey trucks, and the like, are used extensively at earthworking operations, and thus are suited for use with the present invention.

The communications system 100 embodied in FIGS. 1 and 2 provides the advantage of having multiple coordinated communications levels to perform the variety of communications tasks needed for large, complex, earthworking operations. Each of the communications levels is suited for particular communications needs which would not be suitable for use by a different communications level. Each of the communications levels illustrated in FIGS. 1 and 2 are described in more detail below. However, it is noted that other communications levels may be added to the present invention as needed, without deviating from the scope of the invention.

A global communications level 102 provides communications over long range distances. The global communications level 102 may include communications technologies such as satellite communications, long range wired telecommunications, or a combination of both. Preferably, the global communications level 102 uses low bandwidths to communicate information that is not required to be communicated quickly. The use of low bandwidths provides economical advantages as well as more reliable and accurate transmissions of information. The trade-off, speed of transmission, is not objectionable.

In the preferred embodiment, the global communications level 102 is used to communicate summary information relevant to multiple earthworking sites located over a vast geographic area. Information includes, but is not limited to, production rates of the earthworking machines at the earthworking sites, business information for each of the earthworking sites, information for dealers located throughout the world, service and parts information, scheduling and planning information, and the like.

A key advantage to the use of a global communications level 102 is that earthworking operations may be controlled throughout the world, if desired. For example, mining operations usually take place in remote parts of the world, but a central, corporate location is usually desired to control the operations of all the mining sites.

Preferably, at least one site communications level 104 is desired. For example, in the mining operations described above and illustrated in FIG. 1, each mining site would have a site communications level 104 to provide communications throughout that site. A second site would have a second site communications level 104, and so forth. The site communications level 104 would be configured to provide communications over medium range distances, e.g., non line of sight communications up to a range of about twenty kilometers. However, it is noted that the range for the site communications level 104 may vary as needed.

In the preferred embodiment, the site communications level 104 would use low bandwidth communications technologies to achieve the same advantages as described above with reference to the global communications level 102. Examples of the information conveyed over the site communications level 104, include, but are not limited to, status information from the earthworking machines 110 at the site, site database updates, i.e., the terrain map of the site as earthworking operations alter the terrain, job directives, situation descriptions, and service information.

Located at each site, preferably, is at least one geographically smaller theater communications level 106. The theater communications level 106 is adapted for use over short range distances, e.g., non line of sight communications at a range of about one kilometer. It is noted, however, that the range of one kilometer is an approximation only and may vary as needed. An example of the geographic range of the theater communications level 106 is the communications associated with a crusher site at a mining operation, where earthworking machines 110 suited for haulage travel back and forth on a regular basis, and some degree of coordination is required.

The theater communications level 106 uses, in the preferred embodiment, medium bandwidth communications technologies to provide the advantage of communicating greater information at higher speeds.

It is normally desired to communicate more detailed information with the earthworking machines 110 at the theater communications level 106 than would be needed at the global or site communications levels 102,104. For example, information may include, but is not limited to, detailed status information, detailed productivity reports, detailed job directives, and the like. Optionally, at least one remote operator may communicate with one or earthworking machines 110 at the theater communications level 106.

Earthworking machines 110 working in close proximity to each other, e.g., line of sight communications up to about one kilometer, generally require the capability to communicate much more information at much higher speeds. Therefore, a local communications level 108 is provided for close proximity communications. Preferably, the local communications level 108 uses high bandwidth communications technologies to enable communications of large amounts of information over short periods of time.

The local communications level 108 is adapted to provide direct communications between earthworking machines in a close proximity area. For example, in the mining application described above, a loading machine, e.g., a wheel loader or an excavator, may be required to communicate detailed information to hauling machines entering and leaving the dig area of the loading machine. This information may include specific instructions to enable each hauling machine to approach a desired position for the loading machine to load the hauling machine, while avoiding interference with other hauling machines in the area.

In the preferred embodiment, each earthworking machine 110 within the boundaries of a local communications level 108 has a message identification number to allow direct communications with each other earthworking machine 110 within the same local communications level 108. Preferably, each earthworking machine 110 monitors its own position at the earthworking site and adapts a message identification number unique for a local communications level 108 as the earthworking machine 110 determines that it has entered the range of that local communications level 108. The use of message identification numbers allows earthworking machines 110 within a local communications level 108 to communicate freely with each other while avoiding interference in communications with earthworking machines located in adjacent local communications levels 108.

It is well known in the art to use global positioning satellite (GPS) system correction signals, e.g., differential GPS signals, to provide more accurate position determinations. Therefore, in the preferred embodiment of the present invention, it is desired to utilize a GPS system corrections communication level 114 to allow GPS system correction information to be delivered to each earthworking machine 110 in the fleet without interruption. Preferably, the GPS system correction communications level 114 is configured to provide continuous information to the earthworking operations. The GPS system correction communications level 114 may be configured as a stand-alone system, or may be delivered by means of one or more of the communications levels described above.

A machine stop communications level 202 is adapted for stopping operations of at least one earthworking machine 110 in response to a predetermined condition. An example of a predetermined condition which would stop operations of at least one earthworking machine 110 is a determination that an earthworking machine 110 has deviated from its desired position. In the preferred embodiment, the determination that a first earthworking machine 110 has deviated from its desired position would cause all earthworking machines 110 in close proximity to the first earthworking machine 110 to stop operations until the deviation was remedied.

This procedure would preferably take place at the same level as the local communications level 108, although the machine stop communications level 202 would operate at a different frequency than the local communications level 108 to allow the machine stop communications level 202 to have priority. Alternatively, the machine stop communications level 202 is communicated on at least one of the local communications level 108 and the theater communications level 106. In this embodiment, machine stop communications would have priority over other communications on the local communications level 108 and the theater communications level 106.

Another example of a predetermined condition which would cause at least one earthworking machine 110 to stop operations is a determination that a parameter on an earthworking machine 110 has deviated from a predetermined range of tolerance. For example, on-board sensors may sense that a condition may exist in which the earthworking machine 110 requires service or maintenance.

In the preferred embodiment, each earthworking machine 110 within a local communications level 108 communicates a heartbeat signal at the machine stop communications level 202. Preferably, a designated earthworking machine 110 within the local communications level 108, e.g., a loading machine, is adapted to receive the heartbeat signals from all other earthworking machines 110 in that local communications level 108, and is adapted to responsively stop operations of any earthworking machine 110 which fails to communicate the heartbeat signal. Optionally, the designated earthworking machine 110 may stop operations of all earthworking machines 110 in that local communications level 108 in response to the failure of one earthworking machine 110 to communicate the heartbeat signal.

Preferably, communications on the various levels are coordinated by a fleet manager 112. The fleet manager 112 coordinates high level activities. Detailed activities at the local communications level 108 are preferably coordinated by an earthworking machine 110 designated for the task. For example, a loading machine, such as an excavator or a wheel loader, may coordinate the loading activities at the site of the loading machine, while the fleet manager 112 coordinates the higher level activities that affect the earthworking machines at that site, as well as at other sites.

In the preferred embodiment, the fleet manager 112 provides direct communications with the earthworking machines 110 over the site communications level 104. However, the fleet manager 112, as needed, may provide direct communications to the earthworking machines 110 over the theater communications level 106, the local communications level 108, or a combination of the above communications levels. In addition, the fleet manager 112 may provide long range communications over the global communications level 102 to communicate information to a remote site, such as a home office.

It is to be noted that the present invention may be used with manned earthworking machines 110, autonomous earthworking machines 110, remotely controlled earthworking machines 110, or any combination of the above.

Referring now to FIG. 3, a flow diagram illustrating a preferred method of the present invention is shown.

In a first control block 302, a second control block 304, a third control block 306, and a fourth control block 308, communications are performed on a global communications level 102, a site communications level 104, a theater communications level 106, and a local communications level 108, respectively. The choice of the desired communications level to use is coordinated by the fleet manager in a seventh control block 314.

In a fifth control block 310, a GPS system correction signal is communicated on a GPS system correction communications level 114. Preferably, the GPS system correction signal is based on differential GPS, which is well known in the art.

In a sixth control block 312, machine stop information is communicated on a machine stop communications level 202. The machine stop information includes data related to predetermined conditions of each earthworking machine 110, such as position information and sensed parameters. The machine stop information also includes heartbeat signals from each of the earthworking machines 110. Loss of a communicated heartbeat signal from an earthworking machine 110 results in the shutdown of operations of that earthworking machine 110 and possibly the shutdown of operations of other earthworking machines 110 in close proximity to the affected earthworking machine 110. The above described shutdowns are illustrated in a first decision block 316, a second decision block 318, and an eighth control block 320, where the earthworking machine 110 is stopped in response to an indication of a predetermined condition, i.e., the first decision block 316, and a determination that the heartbeat signal is not being received, i.e., the second decision block 318.

INDUSTRIAL APPLICABILITY

As an example of an application of the present invention, the communications needs of large earthworking operations, e.g., mining sites, constructions sites, agricultural operations, and the like, has increased dramatically. Much more information must be communicated much more quickly than ever before. The vast diversity in communications requirements results in the need to use multiple communications technologies and methods. Therefore, it is increasingly important to have the ability to coordinate communications in large earthworking operations to achieve optimal communications while minimizing error and delay.

The present invention is adapted to provide coordinated communications over a plurality of communications levels to insure that all communicated information is delivered quickly, efficiently, and reliably.

Other aspects, objects, and features of the present invention can be obtained from a study of the drawings, the disclosure, and the appended claims.

What is claimed is:

1. A communications system for fleets of earthworking machines engaged in earthworking operations, comprising:
   a global communications level for communicating over long range distances;
   at least one site communications level for communicating over medium range distances;
   at least one theater communications level for communicating over short range distances;
   at least one local communications level for communicating between earthworking machines located in close proximity to each other; and
   a fleet manager for coordinating communications of the earthworking machines as a function of a desired at least one of the global communications level, the at least one site communications level, the at least one theater communications level, and the at least one local communications level.

2. A communications system, as set forth in claim 1, further including a global positioning satellite (GPS) system correction communications level for communicating a GPS system correction signal to the earthworking machines.

3. A communications system, as set forth in claim 1, further including a machine stop communications level for stopping operations of at least one earthworking machine in response to a predetermined condition.

4. A communications system, as set forth in claim 3, wherein a predetermined condition includes a determination that at least one earthworking machine has deviated from a desired position.

5. A communications system, as set forth in claim 3, wherein a predetermined condition includes a determination that a parameter of an earthworking machine has deviated from a predetermined range of tolerance.

6. A communications system, as set forth in claim 3, wherein each earthworking machine communicates a heartbeat signal at the machine stop communications level.

7. A communications system, as set forth in claim 6, wherein operations of an earthworking machine is stopped in response to failure to communicate the heartbeat signal.

8. A communications system, as set forth in claim 1, wherein the global communications level includes a satellite communications system.

9. A communications system, as set forth in claim 1, wherein the global communications level includes a long range wired telecommunications system.

10. A communications system, as set forth in claim 1, wherein the global communications level includes a satellite communications system and a long range wired telecommunications system.

11. A communications system, as set forth in claim 1, wherein the at least one site communications level is adapted for non line of sight communications up to a range of about twenty kilometers.

12. A communications system, as set forth in claim 1, wherein the at least one site communications level is adapted to provide direct communications between the fleet manager and the earthworking machines.

13. A communications system, as set forth in claim 1, wherein the at least one theater communications level is adapted for non line of sight communications at a range of about one kilometer.

14. A communications system, as set forth in claim 3, wherein the machine stop communications level is adapted to communicate machine stop information on the at least one theater communications level.

15. A communications system, as set forth in claim 3, wherein the machine stop communications level is adapted to communicate machine stop information on the at least one local communications level.

16. A communications system, as set forth in claim 3, wherein the machine stop communications level is adapted to communicate machine stop information on at least one of the at least one theater communications level and the at least one local communications level.

17. A communications system, as set forth in claim 1, wherein the at least one local communications level is adapted for line of sight communications at a range up to about one kilometer.

18. A communications system, as set forth in claim 17, wherein the at least one local communications level is adapted to provide direct communications between earthworking machines.

19. A communications system, as set forth in claim 18, wherein each earthworking machine located within a local communications level has a message identification number to allow direct communications with each other earthworking machine located within the same local communications level.

20. A method for communicating information for fleets of earthworking machines engaged in earthworking operations, including the steps of:

communicating on a global communications level in response to the need to communicate over long range distances;

communicating on at least one site communications level in response to the need to communicate over medium range distances;

communicating on at least one theater communications level in response to the need to communicate over short range distances;

communicating on at least one local communications level in response to the need for earthworking machines located in close proximity to each other to communicate with each other; and coordinating the communications of the earthworking machines by a fleet manager as a function of a desired at least one of the global communications level, the at least one site communications level, the at least one theater communications level, and the at least one local communications level.

21. A method, as set forth in claim 20, further including the step of communicating a global positioning satellite (GPS) system correction signal to the earthworking machines on a GPS system correction communications level.

22. A method, as set forth in claim 20, further including the step of communicating machine stop information on a machine stop communications level.

23. A method, as set forth in claim 22, wherein the step of communicating machine stop information includes the step of stopping operations of at least one earthworking machine in response to a predetermined condition.

24. A method, as set forth in claim 23, wherein a predetermined condition includes a determination that at least one earthworking machine has deviated from a desired position.

25. A method, as set forth in claim 23, wherein a predetermined condition includes a determination that a parameter of an earthworking machine has deviated from a predetermined range of tolerance.

26. A method, as set forth in claim 23, wherein the step of communicating machine stop information includes the step of communicating a heartbeat signal by each earthworking machine.

27. A method, as set forth in claim 26, wherein operations of an earthworking machine is stopped in response to failure to communicate the heartbeat signal.

28. A method, as set forth in claim 20, wherein the step of communicating on at least one site communications level includes the step of providing direct communications between the fleet manager and the earthworking machines.

29. A method, as set forth in claim 22, wherein the step of communicating machine stop information on a machine stop communications level includes the step of communicating machine stop information on the at least one theater communications level.

30. A method, as set forth in claim 22, wherein the step of communicating machine stop information on a machine stop communications level includes the step of communicating machine stop information on the at least one local communications level.

31. A method, as set forth in claim 22, wherein the step of communicating machine stop information on a machine stop communications level includes the step of communicating machine stop information on at least one of the at least one theater communications level and the at least one local communications level.

32. A method, as set forth in claim 20, wherein the step of communicating on at least one local communications level includes the step of providing direct communications between earthworking machines.

33. A method, as set forth in claim 32, wherein the step of communicating on at least one local communications level includes the step of providing to each machine located within a local communications level a message identification number to allow direct communications with each other earthworking machine located within the same local communications level.

34. A communications system for fleets of earthworking machines engaged in earthworking operations, comprising:

a global communications level for communicating over long range distances;

at least one site communications level for communicating over medium range distances;

at least one theater communications level for communicating over short range distances;

at least one local communications level for communicating between earthworking machines located in close proximity to each other;

a global positioning satellite (GPS) system correction communications level for communicating a GPS system correct ion signal to the earthworking machines;

a machine stop communications level for stopping operations of at least one earthworking machine in response to a predetermined condition; and a fleet manager for coordinating communications of the earthworking machines as a function of a desired at least one of the global communications level, the at least one site communications level, the at least one theater communications level, the at least one local communications level, the GPS system correction communications level, and the machine stop communications level.

* * * * *